(No Model.) 2 Sheets—Sheet 1.

J. ANDERSON.
MEAT CUTTER AND FEEDING DEVICE.

No. 598,723. Patented Feb. 8, 1898.

WITNESSES
P. H. Angle.
L. Douville.

INVENTOR.
John Anderson
By Wiedersheim & Fairbanks
ATTORNEYS (No Model.) 2 Sheets—Sheet 2.

J. ANDERSON.
MEAT CUTTER AND FEEDING DEVICE.

No. 598,723. Patented Feb. 8, 1898.

WITNESSES
INVENTOR
John Anderson
ATTORNEYS

UNITED STATES PATENT OFFICE.

JOHN ANDERSON, OF PHILADELPHIA, PENNSYLVANIA.

MEAT-CUTTER AND FEEDING DEVICE.

SPECIFICATION forming part of Letters Patent No. 598,723, dated February 8, 1898.

Application filed August 4, 1897. Serial No. 647,018. (No model.)

*To all whom it may concern:*

Be it known that I, JOHN ANDERSON, a citizen of the United States, residing in the city and county of Philadelphia, State of Pennsylvania, have invented a new and useful Improvement in Meat-Cutters and Feeding Devices Therefor, which improvement is fully set forth in the following specification and accompanying drawings.

My invention consists of an improved construction of meat-cutter and feeding device therefor, the same being adapted for also cutting more plastic articles, such as butter, &c., the novel features of which will be hereinafter fully set forth, and particularly pointed out in the claims.

Figure 1:
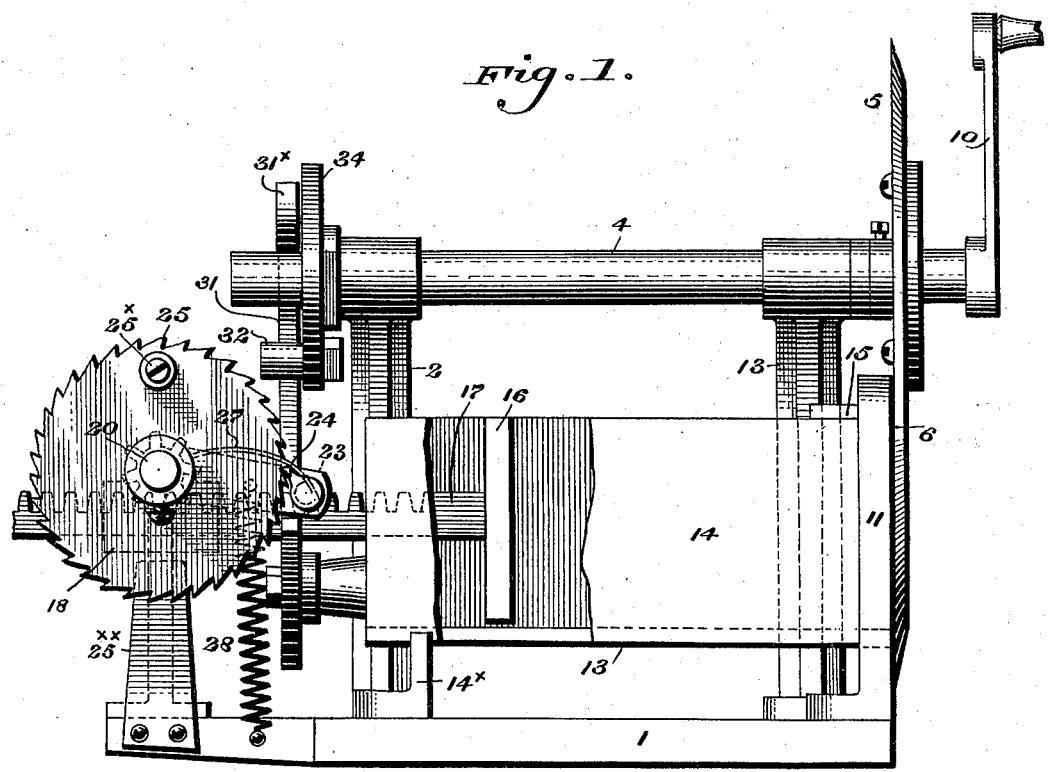
Figure 2:
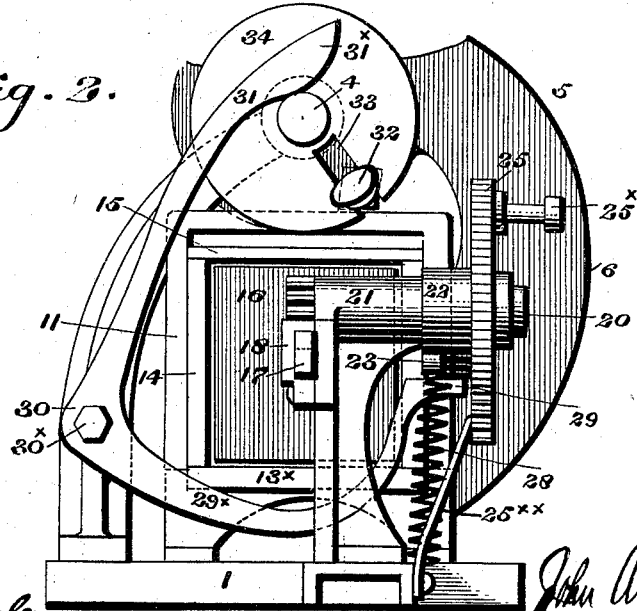
Figure 3:
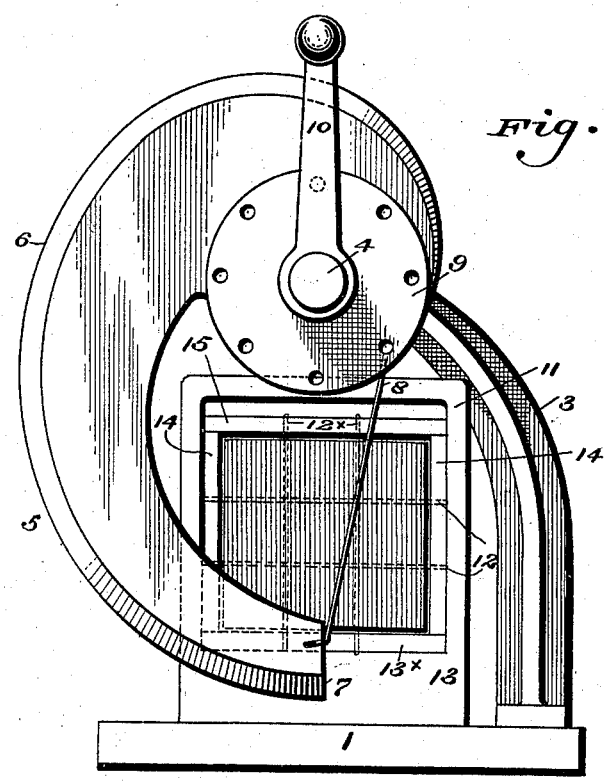
Figure 4:
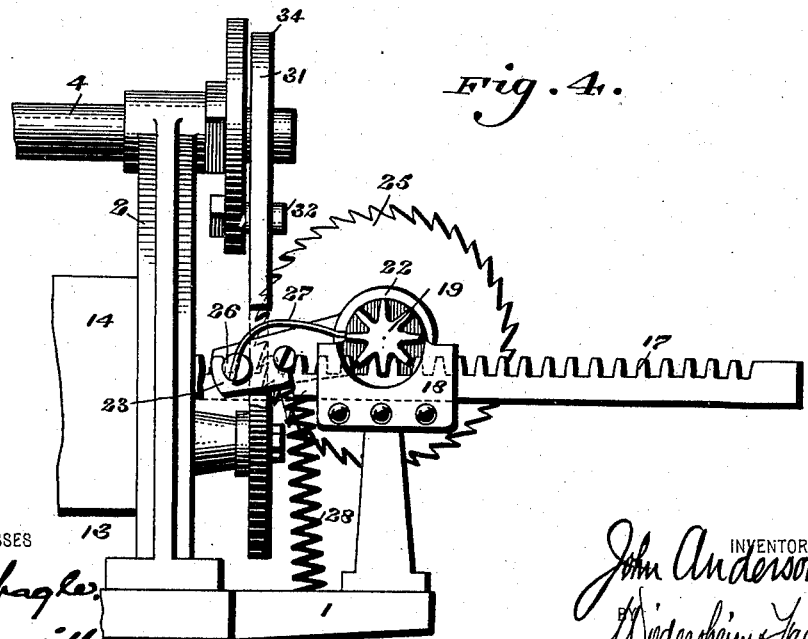

Figure 1 represents a side elevation, partly broken away, of a machine for cutting meat and other articles, embodying my invention. Fig. 2 represents a rear elevation of Fig. 1. Fig. 3 represents a front elevation of Fig. 1. Fig. 4 represents a side elevation of a portion of the feeding mechanism, the same being taken from a point of view opposite to Fig. 1.

Similar numerals of reference indicate corresponding parts in the figures.

Referring to the drawings, 1 designates the bed of the machine, said bed having supported thereon the standards 2 and 3, in the upper portion of which are provided bearings for the shaft 4, which latter has mounted thereon the cutting device or blade 5, the cutting edge 6 of which extends in the present instance a little over one hundred and eighty degrees, the preferable shape of said blade being that seen in Fig. 3, whereby an open space is formed in the terminus 7 of the cutting edge, from which latter extends the wire or similar device 8, the other extremity of the latter being secured to the disk 9, which carries the blade 5, or to some suitable portion of the latter, said wire 8 being adapted to cut butter or similar plastic articles, while the blade 5 is adapted for cutting meat, bread, &c.

10 designates a crank-handle mounted on the shaft 4, whereby the latter is readily rotated or oscillated.

11 designates a frame mounted upon the front portion of the bed 1 and terminating substantially in line with the cutting edge of the blade 5, said frame having a receptacle 13 supported therein, the rear portion of said receptacle being sustained upon a support $14^\times$. The receptacle 13 is open at both ends and consists of the base $13^\times$ and the upwardly-extending walls 14, the front portion of which is bridged by a cross-piece 15.

12 designates a series of wires which are arranged horizontally across the front of the receptacle 13 and at substantially a right angle to the wires $12^\times$, the object of which wires will be explained.

16 designates a plunger or feeder which is adapted to move in the receptacle 13, said plunger being secured to the rack-bar 17, which passes through a suitable casing or bearings 18, located in the rear portion of the machine. 19 designates a pinion adapted to engage the teeth of said rack and cause the reciprocation of the same, said pinion being mounted on the shaft 20, which has suitable bearings in the box 21.

22 designates a collar loosely mounted on the shaft 20, said collar having an arm 23 projecting therefrom.

24 designates a pawl movably mounted at or near the extremity of the arm 23 and adapted to engage the toothed or ratchet wheel 25, said pawl being held in its proper position by means of the spring 27, which has one end in the present instance attached to the collar 22, while its other end bears upon the portion 26 of said pawl 24 which projects through said arm 23.

28 designates a spring which has one end attached to a suitable fixed point, while its other extremity is secured to the arm 23 and tends to normally pull the same downwardly or to hold it in contact with the extremity 29 of the member $29^\times$ of the elbow-lever 30, the latter being fulcrumed at a suitable point $30^\times$ and having the arm 31, which is provided with a cam-face $31^\times$, the latter being engaged by the pin 32, which is mounted in a slot 33 of the disk or plate 34, said pin being held in position by means of a nut or other suitable device and being adjustable in said slot, whereby the extent of motion imparted to the elbow-lever 30, and consequently to the plunger or feeding device 16, can be regulated at will.

The ratchet-wheel 25 is prevented from improper movement by means of the spring $25^{\times\times}$, which has one end attached to the bed 1 and its other or free end bearing against said wheel, so that movement of the latter will be retarded.

The operation is as follows: When it is desired to cut butter or similar plastic material, the device seen in Fig. 3 is employed, the receptacle 13, having the wires 12 and 12×, being used and the cutting being performed by means of the wire 8, whereby the butter will be cut into the form of cubes. The rotation or oscillation of the shaft 4 will at the proper intervals cause the elbow-lever 30 to be actuated through the medium of the pin 32 and the cam-face 31×, whereby the arm 23, which carries the pawl 24, is alternately raised and lowered, and said pawl is caused to engage the teeth of the ratchet-wheel 25 through the medium of the spring 27, said ratchet-wheel, together with the pinion 19, being thus intermittently rotated always in one direction and causing the rack-bar and the plunger or feeding device 16 always to move in the direction of the cutting device 5 during the rotation or oscillation of the shaft 4. When the pusher or plunger 16 is moved to the extreme right of the position seen in Fig. 1, it can be returned to its extreme left-hand position by disengaging pawl 24 from the ratchet-wheel 25, the latter being rotated in the proper direction by means of the handle 25×.

When it is desired to cut meat, bread, or other similar articles, the receptacle containing the cross-wires 12 and 12× is removed and a receptacle without wires is employed, the cutting being effected by the edge 6.

It will be seen from the peculiar contour of the knife that the latter is so shaped as to permit the material to pass under it at a certain point.

It will of course be evident that changes may be made by those skilled in the art which will come within the scope of my invention, and I therefore do not desire to be limited in every instance to the exact construction herein shown and described.

Having thus described my invention, what I claim as new, and desire to secure by Letters Patent, is—

1. In a machine of the character named, a bed with standards, a rotatable shaft journaled in said standards and having a cutting device secured thereto, said device consisting of an apertured blade and a wire bridging the opening in said blade, a plate on said shaft with a pin projecting therefrom, an elbow-lever having an arm actuated by contact with said pin, a pawl actuated by said lever, a feeding device having a rack-bar, a shaft carrying a pinion engaging said rack-bar, and a ratchet engaged by said pawl.

2. In a machine of the character named, a cutting device 5 consisting of the blade 6, constructed substantially as shown, a shaft on which said blade is mounted, and a wire bridging the open space of said cutting device.

3. In a machine of the character named, a shaft suitably supported, a cutting device carried thereby, a plate mounted on said shaft, a pin adjustably secured in said disk, an elbow-lever suitably fulcrumed and having one arm provided with a cam-face actuated by said pin, the other member of said elbow-lever being adapted to actuate an oscillatory arm, a spring common to said latter arm and a fixed point, a pawl mounted on said arm, a ratchet-wheel engaged by said pawl, a spring bearing on the latter, and a feeding device actuated by said ratchet-wheel.

4. In a machine of the character named, a bed, a frame supported upon the front of said bed and adapted to sustain a receptacle, a feeding device mounted therein, a rack-bar connected with said device, a pinion engaging said rack-bar, a shaft on which said pinion is mounted, a collar loosely mounted on said shaft and carrying an arm, a ratchet-wheel fast on said shaft, a pawl mounted in said arm and adapted to engage said ratchet-wheel, a spring holding said pawl in position, an elbow-lever having one arm adapted to contact with said pawl-bearing arm, a shaft having a cutting device mounted thereon, and a cam device common to said shaft and the other arm of said elbow-lever.

JOHN ANDERSON

Witnesses:
JOHN A. WIEDERSHEIM,
WM. C. WIEDERSHEIM.